(12) United States Patent
Chuang et al.

(10) Patent No.: US 11,589,049 B2
(45) Date of Patent: Feb. 21, 2023

(54) METHOD AND APPARATUS OF SYNTAX INTERLEAVING FOR SEPARATE CODING TREE IN VIDEO CODING

(71) Applicant: MEDIATEK INC., Hsinchu (TW)

(72) Inventors: Tzu-Der Chuang, Hsinchu (TW); Ching-Yeh Chen, Hsinchu (TW); Kung-Nien Yang, Hsinchu (TW); Chun-Chia Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 42 days.

(21) Appl. No.: 17/395,549

(22) Filed: Aug. 6, 2021

(65) Prior Publication Data

US 2021/0368175 A1 Nov. 25, 2021

Related U.S. Application Data

(62) Division of application No. 17/051,276, filed as application No. PCT/CN2019/085273 on Apr. 30, 2019, now Pat. No. 11,115,660.
(Continued)

(51) Int. Cl.
 *H04N 19/70* (2014.01)
 *H04N 19/119* (2014.01)
 (Continued)

(52) U.S. Cl.
 CPC ......... *H04N 19/119* (2014.11); *H04N 19/176* (2014.11); *H04N 19/186* (2014.11); *H04N 19/70* (2014.11); *H04N 19/96* (2014.11)

(58) Field of Classification Search
 CPC .. H04N 19/119; H04N 19/176; H04N 19/186; H04N 19/70; H04N 19/96
 See application file for complete search history.

(56) References Cited

U.S. PATENT DOCUMENTS 8,682,090 B2 * 3/2014 Suzuki ................. H04N 19/136
 382/233
9,210,442 B2 12/2015 Panusopone et al.
(Continued)

FOREIGN PATENT DOCUMENTS

CA 2 866 900 A1 10/2013
CN 104221376 A 12/2014
(Continued)

OTHER PUBLICATIONS

Chinese language office action dated Dec. 25, 2021, issued in application No. CN 201980028282.7.
(Continued)

*Primary Examiner* — Tsion B Owens
(74) *Attorney, Agent, or Firm* — McClure, Qualey & Rodack, LLP

(57) ABSTRACT

A method and apparatus of video coding operate by receiving input data associated with a current data unit in a current picture, wherein the current data unit includes a luma component and a chroma component and the current data unit includes a luma data unit and a chroma data unit. The operation proceeds by splitting the luma data unit and the Chroma data unit using one shared tree until the luma data unit and the chroma data unit reach a stop node, encoding or decoding the stop node as a leaf CU (coding unit) if the stop node is greater than M×N for the luma component, M and N are positive integers, and signalling or parsing a prediction mode for the stop node if the stop node is smaller than or equal to M×N for the luma component.

10 Claims, 8 Drawing Sheets

Related U.S. Application Data

(60) Provisional application No. 62/714,153, filed on Aug. 3, 2018, provisional application No. 62/700,265, filed on Jul. 18, 2018, provisional application No. 62/692,855, filed on Jul. 1, 2018, provisional application No. 62/676,330, filed on May 25, 2018, provisional application No. 62/666,177, filed on May 3, 2018, provisional application No. 62/664,387, filed on Apr. 30, 2018.

(51) Int. Cl.
*H04N 19/176* (2014.01)
*H04N 19/186* (2014.01)
*H04N 19/96* (2014.01)

(56) References Cited

U.S. PATENT DOCUMENTS

| | | |
|---|---|---|
| 10,009,612 B2 | 6/2018 | Liu et al. |
| 10,390,050 B2 | 8/2019 | An et al. |
| 2013/0322531 A1 | 12/2013 | Chen et al. |
| 2015/0043639 A1* | 2/2015 | Lee .................. H04N 19/30 375/240.12 |
| 2015/0326863 A1 | 11/2015 | Francois et al. |
| 2016/0227224 A1* | 8/2016 | Hsieh .................. H04N 19/186 |
| 2017/0272748 A1 | 9/2017 | Seregin et al. |
| 2018/0070110 A1 | 3/2018 | Chuang et al. |
| 2018/0139430 A1* | 5/2018 | Cho .................. H04N 11/042 |
| 2019/0075328 A1* | 3/2019 | Huang .................. H04N 19/119 |
| 2020/0036985 A1 | 1/2020 | Jang et al. |
| 2021/0058618 A1* | 2/2021 | Zhang .................. H04N 19/176 |
| 2021/0136411 A1* | 5/2021 | Zhang .................. H04N 19/577 |

FOREIGN PATENT DOCUMENTS

| | | |
|---|---|---|
| CN | 107079160 A | 8/2017 |
| WO | 2015/138927 A1 | 9/2015 |
| WO | 2017/157249 A1 | 9/2017 |

OTHER PUBLICATIONS

Extended European Search Report dated Jan. 25, 2022, issued in application No. EP 19796265.7.

Ma, J., et al; "Description of Core Experiment 1 (CE1):Partitioning;" Joint Video Exploration Team (JVET) of ITU-T SG 16 WP 3 and ISO/IEC JTC 1/SC 29/WG 11; Apr. 2018; pp. 1-30.

Misra, K., et al.; "Description of SDR and HDR video coding technology proposal by Sharp and Foxconn;" Joint Video Exploration Team (JVET) of ITU-T SG 16 WP 3 and ISO/IEC JTC 1/SC 29/WG 11; Apr. 2018; pp. 1-69.

International Search Report and Written Opinion dated Jul. 25, 2019, issued in application No. PCT/CN2019/085273.

Chinese language office action dated Jul. 9, 2020, issued in application No. TW 108115050.

Lu, J., et al.; "A fast block partition algorithm for HEVC;" IEEE; Dec. 2013; pp. 1-5.

\* cited by examiner

METHOD AND APPARATUS OF SYNTAX INTERLEAVING FOR SEPARATE CODING TREE IN VIDEO CODING

CROSS REFERENCE TO RELATED APPLICATIONS

The present invention is a Divisional of U.S. patent application Ser. No. 17/051,276 filed on Oct. 28, 2020, which is a 371 National Phase of PCT Application No. PCT/CN2019/085273 filed on Apr. 30, 2019, which claims priority to U.S. Provisional Patent Application Ser. No. 62/664,387 filed on Apr. 30, 2018, U.S. Provisional Patent Application Ser. No. 62/666,177 filed on May 3, 2018, U.S. Provisional Patent Application Ser. No. 62/676,330 filed on May 25, 2018, U.S. Provisional Patent Application Ser. No. 62/692,855 filed on Jul. 1, 2018, U.S. Provisional Patent Application Ser. No. 62/700,265 filed on Jul. 18, 2018 and U.S. Provisional Patent Application Ser. No. 62/714,153 filed on Aug. 3, 2018. The U.S. Provisional Patent Applications are hereby incorporated by reference in their entireties.

FIELD OF THE INVENTION

The present invention relates to block partition and syntax signalling in video coding. In particular, the present invention discloses interleaved luma and chroma syntax signalling and various derivation for decision to apply a shared coding tree or separate coding trees for luma and chroma blocks.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called as quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., MaxBTSize), it can be further partitioned by a binary tree. The binary tree splitting of one node can be iterated until the node reaches the minimum allowed binary tree leaf node size (i.e., MinBT Size) or the maximum allowed binary tree depth (i.e., MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure usually applied with the luma/chroma separate coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

Bilateral Template MV Refinement (Also Named as DMVR)

Bilateral Template MV Refinement (BTMVR) is also referred as Decoder-side MV refinement (DMVR) in some literature. For example, in JVET-D0029 (Xu Chen, et al., "Decoder-Side Motion Vector Refinement Based on Bilateral Template Matching", Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0029), Decoder-Side Motion Vector Refinement (DMVR) based on bilateral template matching is disclosed. The process of BTMVR is shown in FIG. 6, where block 610 is a current block. Initial motion vectors MV0 620a and MV1 620b for current block 610 are determined. For example, the initial motion vectors may be derived from the Merge candidate. The BTMVR process is applied to a bi-predicted block. In other words, MV0 points to an L0 reference picture 670a and MV1 points to an L1 reference picture 670b. An L0 reference block 630a in L0 reference picture 670a can be located from the corresponding location 610a of the current block in L0 reference picture 670a and MV0 620a. Similarly, an L1 reference block 630b in L1 reference picture 670b can be located from the corresponding location 610b of the current block in L1 reference picture 670b and MV1 620b. A template 640 is generated by using the bi-prediction from the two reference blocks (630a and 630b) pointed by MV0 620a and MV1 620b respectively, as shown in FIG. 6. In one embodiment, the bilateral template 640 is calculated as the average of L0 block 630a and L1 block 630b, but not limited to this embodiment. In the next step, it uses the bilateral template to do integer ME (Motion Estimation) and fractional ME searching around L0 Reference Block in L0 Reference Picture with a search range of P pixel×Q pixel, and finds the location of minimum ME cost. The ME cost has many embodiments, one embodiment is the SAD (Sum of Absolute Difference), but not limited to this embodiment. The final location of minimum ME cost is assigned to a refined MV of L0. Similar step is applied to located a refines MV of L1. For example, using the template as a new current block and perform the motion estimation to find a better matching block (i.e., refined reference block 650a and refined reference block 650b) in L0 reference picture 660a and L1 reference picture 660b, respectively, as shown in FIG. 6. The refined MVs are referred as the MV0' 660a and MV1' 660b, as shown in FIG. 6. Then the refined MVs (MV0' and MV1') are used to generate a final bi-predicted prediction block for the current block.

Neighbouring-Derived Prediction Offset (NPO)

Neighbouring-derived Prediction Offset (NPO) is a new coding tool developed recently to improve the motion compensated predictors adding a prediction offset. With this offset, the different lighting conditions between frames can be considered. The offset is derived using neighbouring reconstructed pixels (NRP) and extended motion compensated predictors (EMCP).

FIG. 7 shows an exemplary implementation to derive the offset. The patterns chosen for NRP and EMCP are N-columns (712 and 722) on the left and M rows (714 and 724) on the top of the current PU710 and the reference block 720 respectively, where N and M are predetermined values. While rectangular NRP and EMCP are illustrated in the example, the patterns can be of any size and shape and can be decided according to any encoding parameters, such as PU or CU sizes, as long as both NRP an EMCP use the same size and shape. The offset is calculated as the average pixel value of NRP minus the average pixel value of EMCP. This derived offset will be applied to the whole PU as well as the motion compensated predictors.

FIG. 8 shows another exemplary implementation to derive the offset. First, for each of neighbouring positions (i.e., left pixels 810 and above pixels 820 of the left boundary and top boundary of the current block 830), the individual offset is calculated as the corresponding pixel in NRP minus the pixel in EMCP. Exemplary offset values of 6, 4, 2, and −2 for the above neighbouring positions 820 and 6, 6, 6, and 6 for the left neighbouring positions 810 are shown in FIG. 8.

After the offset values for the neighbouring positions are obtained, the derived offset for each position in the current PU 830 will be derived as the average of the offsets from the left and above positions as shown in illustration 840. For example, the first position at the top left corner 831 of the current PU 830, offset of 6 will be generated by averaging the offset from left and above (i.e., (6+6)/2=6). For the next position 832 on the right, the offset is derived as 5 (i.e., (6+4)/2=5). The offset values for the remaining positions can be processed and generated accordingly in a raster scan order. Since the neighbouring pixels are more highly correlated to the boundary pixels, so are the offsets. The offset can be adapted to the pixel positions according to NPO. The derived offsets will be adapted over the PU and applied to each PU position individually along with the motion compensated predictors.

Local Illumination Compensation (LIC)

Local Illumination Compensation (LIC) is a method to perform Inter prediction using neighbouring samples of the current block and a reference block. It is based on a linear model using a scaling factor a and an offset b. The method derives the scaling factor a and the offset b by referring to the neighbour samples of the current block and the reference block. The neighbouring samples of the current block and the reference block correspond to an L-shaped including neighbouring pixels above and neighbouring pixels on the left of the current block and the reference block. After the scaling factor a and the offset b are derived, the LIC processed pixel l(x,y) is derived according to $l(x,y)=a*r(x,y)+b$, where $r(x,y)$ corresponds to the motion-compensated reference data. Moreover, the LIC process can be enabled or disabled adaptively for each CU.

More details regarding LIC can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

Conventional Sub-PU Temporal Motion Vector Prediction (Sub-PU TMVP)

To improve the coding efficiency, a Sub-PU Temporal Motion Vector Prediction (Sub-PU TMVP, also called advanced temporal motion vector prediction, ATMVP) mode is applied in the merge mode. That is, the Sub-PU TMVP is a merge candidate for merge mode. As shown in FIG. 9, unlike the traditional temporal candidate, the Sub-PU TMVP mode partitions the current PU into multiple Sub-PUs, and finds all corresponding temporal collocated motion vectors for each Sub-PU. The current PU of size M×N has (M/P)×(N/Q) sub-PUs, each sub-PU is of size P×Q, which M is divisible by P, and N is divisible by Q. The example in FIG. 9 corresponds to the case that a current PU 910 is divided into 16 sub-PUs (i.e., M/P=4 and N/Q=4). Sub-PU 0 (911) and sub-PU 1 (912) are indicated. The detailed algorithm for sub-PU TMVP is described as follows. The detail algorithm for Sub-PU TMVP is described as follows.

In step 1, for the current PU 910, an "initial motion vector", denoted it as vec_init is determined for the sub-PU TMVP mode. For example, the vec_init can be the MV of the first available spatial neighbouring block of the current PU 910. Alternatively, the MV of other neighbouring block may also be used as the initial motion vector. Conventionally, the vec_init is the first available candidate among spatial neighbouring blocks. For example, if the first available spatial neighbouring block has L0 and L1 MVs, and LX is the first list for searching collocated information, then the vec_init uses L0 MV when LX=L0, or L1 when LX=L1. The value of LX (L0 or L1) depends on which list (L0 or L1) is better for collocated information. If L0 is better for collocated information (e.g. POC (Picture Order Count) distance closer than L1), then LX is equal to L0, and vice versa. LX assignment can be performed at a slice level, brick level, tile group level, or picture level.

A "collocated picture searching process" then starts. The "collocated picture searching process" is to find a main collocated picture for all sub-PUs in the Sub-PU TMVP mode. The main collocated picture is denoted as main_colpic. Conventionally, it first searches the reference picture selected by the first available spatial neighbouring bloc. Then, in B-Slices, it searches all reference pictures of current picture starting from L0 (or L1), reference index 0, then index 1, then index 2, and so on (increasing index order). If it finishes searching L0 (or L1), then it searches another list. In P-slice, it first searches the reference picture selected by the first available spatial neighbouring block. Then, it searches all reference pictures of current picture of the list starting from reference index 0, then index 1, then index 2, and so on (increasing index order).

During searching, for each searched picture, a process named "availability checking" is performed. The "availability checking" process checks the collocated sub-PU around centre position of the current PU pointed by vec_init_scaled, where vec_init_scaled is the MV with appropriate MV scaling from the vec_init. Various ways can be used to determine the "around centre position". The "around centre position" may correspond to the centre pixel. For example, if the PU size is M*N, the centre is equal to position (M/2, N/2). The "around centre position" may also correspond to the centre sub-PU's centre pixel. The "around centre position" may be the mix of the above two methods depending on the current PU shape. In the "availability checking", if the checking result is an Inter mode, then the availability is true; otherwise (the checking result being an Intra mode), then the availability is false. After "availability checking", if the availability is true, then current searched picture is labelled as the main collocated picture and the searching process finishes. If the availability is true, the MV of the "around centre position" is used and scaled for the current block to derive the "default MV". If the availability is false, then it goes to search next reference picture.

During the "collocated picture searching process", MV scaling is needed when the reference picture of the vec_init is not equal to the original reference picture. The MV scaling process is that, a scaled version of the motion vector is used. The MV is scaled based on the temporal distances between the current picture and the reference picture of the vec_init and the searched reference picture, respectively. After MV scaling, the scaled MV is denoted as vec_init_scaled.

In step 2, for each sub-PU, it further finds collocated location in main_colpic. Assuming the current Sub-PU is Sub-PU i, the collocated location is calculated as shown in follows:

$$\text{collocated location } x = \text{Sub-PU}\_i\_x + \text{vec\_init\_scaled}\_i\_x(\text{integer part}) + \text{shift}\_x,$$

$$\text{collocated location } y = \text{Sub-PU}\_i\_y + \text{vec\_init\_scaled}\_i\_y(\text{integer part}) + \text{shift}\_y.$$

In the above equations, Sub-PU_i_x means horizontal left-top location of sub-PU i inside the current picture (integer location), Sub-PU_i_y means vertical left-top location of sub-PU i inside the current picture (integer location), vec_init_scaled_i_x means horizontal part of vec_init_scaled_i, which has integer part and fractional part and we only use integer part in the calculation, and vec_init_scaled_i_y means vertical part of vec_init_scaled_i, which has integer part and fractional part and we only use integer part in the calculation. shift_x means a shift value. The shift_x can be half of sub-PU width. shift_y means a shift value. In one example, shift_y can be half of sub-PU height, but other method may also be used.

Finally, in step 3, it finds the motion information temporal predictor for each Sub-PU, which is denoted as SubPU_MI_i, of each Sub-PU. The SubPU_MI_i is the motion information (MI) from collocated_picture_i_L0 and collocated_picture_i_L1 on collocated location x, collocated location y. Here MI is defined as the set of {MV_x, MV_y, reference lists, reference index, and other merge-mode-sensitive information, such as local illumination compensation flag}. Moreover, in one example, MV_x and MV_y may be scaled according to the temporal distance relation between collocated picture, current picture, and reference picture of the collocated MV. If MI is not available for some Sub-PU, then the MI of Sub-PU around centre position will be used (in another word, the default MV is used).

Conventionally, there is only one Sub-PU TMVP candidate in the candidate list.

Spatial-Temporal Motion Vector Prediction (STMVP)

In JEM-3.0 (Chen et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001), a spatial-temporal motion vector prediction (STMVP) is also included in merge mode coding. In STMVP, the motion vectors of the sub-CUs are derived recursively following the raster scan order by using the temporal motion vector predictor and spatial neighbouring motion vector. FIG. 10 illustrates the concept of STMVP. Let us consider an 8×8 CU 1010 which contains four 4×4 sub-CUs, A, B, C, and D. The neighbouring N×N blocks in the current frame are labeled as a, b, c, and d. The motion derivation for sub-CU A starts by identifying its two spatial neighbours. The first neighbour is N×N block above sub-CU A (block c). If this block c is not available or is Intra coded, the other N×N blocks above sub-CU A are checked (from left to right, starting at block c). The second neighbour is a block to the left of the sub-CU A (block b). If block b is not available or is Intra coded, other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the co-located block at location D is fetched and scaled accordingly. At last, after retrieving and scaling the motion information, all available motion vectors (up to 3) are averaged separately for each reference list. The averaged motion vector is assigned as the motion vector of the current sub-CU.

PMVD Mode or FRUC Mode

The PMVD mode (or named as PMMVD or FRUC (Frame Rate Up Conversion) mode) is a coding tool which can use an L-shape template or bi-lateral template to refine the MV of merge mode and save the bits of MVD. Details of the FRUC is described in JETM3 ("Algorithm Description of Joint Exploration Test Model 3", in Joint Video Exploration Team (JVET) of ITU-T SG 16 WP 3 and ISO/IEC JTC 1/SC 29/WG 11: 3rd Meeting: Geneva, CH, 26 May-1 Jun. 2016). The particular section related to FRFUC is section 2.3.7: Pattern matched motion vector derivation.

The PMVD mode is not restricted to the description in the JVET document, any inter mode tool which using pattern-based refinement as the PMVD behaviour can also be denoted as PMVD or FRUC mode.

LM Chroma Mode

The Intra predictor is usually designed to exploit spatial features in the picture such as smooth area (DC mode), vertical line or edge, horizontal line or edge and diagonal line or edge. Furthermore, spatial correlation often exists between the luminance (luma) and chrominance (chroma) components. Therefore, reconstructed luma pixels can be used to derive the Intra chroma prediction. In the emerging High Efficiency Video Coding (HEVC), a chroma Intra prediction mode based on the reconstructed luminance signal has been considered. This type of chroma Intra prediction is termed as Linear Model (LM) prediction. FIG. 11 illustrates the Intra prediction derivation for LM mode. First, the neighbouring reconstructed pixels (indicated by circles) of a collocated luma block (i.e., Y block) and the neighbouring reconstructed pixels (indicated by circles) of a chroma block (i.e., U or V block) in FIG. 11 are used to derive the linear model parameters between the blocks. The predicted pixels of the chroma block are generated using the parameters and the reconstructed pixels of the luma block. In the parameters derivation, the top reconstructed pixel row adjacent to the top block boundary of the current luma block and the left reconstructed pixel column adjacent to the left block boundary of the current luma block are used. It is noted that the second left reconstructed pixel column from the left boundary is used instead of the left column immediately adjacent to the left boundary in order to match the sampling locations of the chroma pixels. The specific row and column of the luma block are used in order to match the 4:2:0 sampling format of the chroma components. While FIG. 11 illustrates the example of LM chroma mode for the 4:2:0 sampling format, the LM chroma mode for other chroma sampling format may also derived similarly.

According to the LM prediction mode, the chroma values are predicted from reconstructed luma values of a collocated block. The chroma components may have lower spatial resolution than the luma component. In order to use the luma signal for chroma Intra prediction, the resolution of the luma signal may have to be reduced to match with that of the chroma components. For example, for the 4:2:0 sampling format, the U and V components only have half of the number of samples in vertical and horizontal directions as the luma component. Therefore, 2:1 resolution reduction in vertical and horizontal directions has to be applied to the reconstructed luma samples. The resolution reduction can be achieved by down-sampling process or sub-sampling process.

In LM chroma mode, for a to-be-predicted chroma sample V with its collocated reconstructed luma sample $V_{col}$, the linear model to generate LM predictor P is formulated as follows:

$$P = a \cdot V_{col} + b$$

In the above equation, a and b are referred as LM parameters. The LM parameters can be derived from the neighbouring reconstructed luma and chroma samples around the current block so that the parameters do not need to be coded in the bitstream. After deriving the LM parameters, chroma predictors can be generated from the collocated reconstructed luma samples in the current block according to the linear model. For example, if the video format is YUV420, then there are one 8×8 luma block (1110) and two 4×4 chroma blocks (1120 and 1130) for each 8×8 coding unit, as shown in FIG. 11. In FIG. 11, each small square corresponds to one pixel in the current coding unit (2N×2N for luma and N×N for chroma) to be coded. The LM parameters are derived first based on neighbouring reconstructed samples of the current coding unit, which are represented as circles in FIG. 11. Due to the YUV420 sampling format, the collocated chroma position is located between two corresponding vertical luma samples. An average value between two corresponding vertical luma samples is used to derive the LM parameters. For neighbouring pixels above the top block boundary, the average value is replaced by the closest sample in the vertical direction in order to reduce the line buffer requirement. The neighbouring pixels (as shown in circles) of the currently luma (Y) and chroma (U or V) coding units are used to derive the LM parameters for the respective chroma component as shown in FIG. 11. After the LM parameters are derived, the chroma predictors are generated based on the linear model and the collocated luma reconstructed samples. According to the video format, an average luma value may be used instead of the corresponding luma sample.

While QTBT provides flexible partition and results in improved coding performance, QBQT also increases computational complexity. Furthermore, the trend to use higher resolution video contents also causes increased computational complexity and high buffer requirements. It is desirable to develop block partition and syntax signalling techniques for colour video to reduce the computational complexity and/or buffer requirement.

BRIEF SUMMARY OF THE INVENTION

A method and apparatus for block partition in video encoding and decoding are disclosed. According to one method of the present invention, input data associated with a current data unit in a current picture are received, where the input data associated with the current data unit correspond to pixel data of the current data unit. The current data unit comprises a luma component and one or more chroma components and the current data unit comprises a luma data unit and a chroma data unit, or the current data unit comprises a luma component block and one or more chroma component blocks. The current data unit is partitioned into multiple initial blocks using inferred splitting without split-syntax signalling, where the multiple initial blocks comprises multiple initial luma blocks and multiple initial chroma blocks, and wherein size of the initial luma block is M×N, M and N are positive integers and the current data unit is larger than M×N for the luma component. A partition structure is determined for partitioning the initial luma block and the one or more initial chroma blocks of an initial block into one or more luma CUs (coding units) and one or more chroma CUs respectively. One or more luma syntaxes and one or more chroma syntaxes associated with one initial block in the current data unit are signalled or parsed, and then one or more luma syntaxes and one or more chroma syntaxes associated with one next initial block in the current data unit are signalled or parsed. The current data unit may correspond to a CTU (coding tree unit). Furthermore, the CTU may have a block size corresponding to 128×128 or 256×256 and M and N equal to 64 for the luma component. In one embodiment, if there is more than one chroma components, the chroma component data share the same coding tree partitioning. In one embodiment, the inferred splitting is applied when the current slice is I-slice or when the current slice is I-slice and the non-coding-tree-sharing is enabled.

The partition structure may comprise separate coding trees for each initial block to partition the luma block and the initial one or more chroma blocks in each initial block. The current data unit may be partitioned using quadtree (QT) split into said multiple initial luma blocks having a block size equal to M×N.

In one embodiment, said one or more luma syntaxes associated with said one initial block in the current data unit are signalled or parsed before said one or more chroma syntaxes associated with said one initial block in the current data unit.

In one embodiment, M×N corresponds to a predefined or derived block size, or maximum TU (transform unit) size, or a size related to the maximum TU size or minimum TU size. The information related to M and N can be signalled at a sequence level, picture level, slice level, brick level, tile group level, or tile level.

In one embodiment, one or more shared-separate syntaxes are signalled or parsed for the current data unit to indicate whether the current data unit uses coding-tree-sharing or non-coding-tree-sharing. If said one or more shared-separate syntaxes indicate that the current data unit uses coding-tree-sharing, all CUs (coding units) within the current data unit use the coding-tree-sharing. If said one or more shared-separate syntaxes indicate that the current data unit uses non-coding-tree-sharing, all CUs (coding units) within the current data unit use the non-coding-tree-sharing.

In one embodiment, one or more shared-separate syntaxes are signalled or parsed for the current data unit to indicate whether the current data unit uses coding-tree-sharing or non-coding-tree-sharing. If said one or more shared-separate syntaxes indicate that the current data unit uses coding-tree-sharing, all CUs (coding units) within the current data unit use the coding-tree-sharing. If said one or more shared-separate syntaxes indicate that the current data unit uses non-coding-tree-sharing, partitioning the current data unit into multiple initial blocks using inferred splitting without split-syntax signalling when the current data unit is larger than M×N for the luma component; determining a partition structure for partitioning the initial luma block and the initial one or more chroma blocks of an initial block into one or more luma CUs and one or more chroma CUs respectively.

According to another method, the luma data unit and the chroma data unit are split using one shared tree until the luma data unit and the chroma data unit reaches a stop node. The stop node is encoded or decoded as a leaf CU (coding unit) if the stop node is greater than M×N for the luma component, M and N are positive integers. A prediction mode is signalled or parsed for the stop node if the stop node is smaller than or equal to M×N for the luma component.

In one embodiment, if the prediction mode for the stop node corresponds to an Intra mode, one or more first syntaxes are signalled or parsed to indicate whether the stop node uses coding-tree-sharing or non-coding-tree-sharing. If said one or more first syntaxes indicate that the stop node uses the coding-tree-sharing, the stop node is designated as a leaf node. Furthermore, if said one or more first syntaxes indicate that the stop node uses the non-coding-tree-sharing, the stop node is further split. One or more luma syntaxes associated with the stop node can be signalled or parsed prior to one or more chroma syntaxes associated with the stop node. In yet another embodiment, if the prediction mode for the stop node corresponds to an Intra mode or a non-inter mode, further coding the stop node using non-coding-tree-sharing.

In another embodiment, if the stop node is greater than M×N for the luma component, the prediction mode for the stop node corresponds to an Intra mode and the stop node uses coding-tree-sharing. In yet another embodiment, if the stop node is greater than M×N for the luma component, the stop node is inferred to be partitioned into multiple TUs (transform units) in residual coding of the stop node. In still yet another embodiment, if the stop node is greater than M×N for the luma component, the prediction mode for the stop node is inferred as an Inter mode or is not allowed to be an Intra mode.

DETAILED DESCRIPTION OF THE INVENTION

Figure 1:
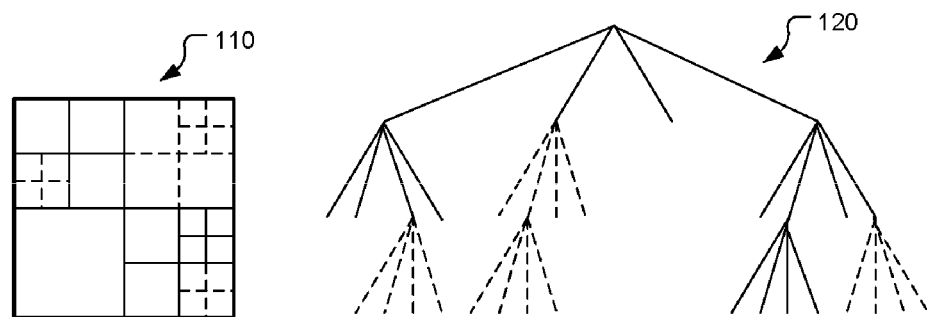
FIG. 1 illustrates an example of block partition using quadtree structure to partition a coding tree unit (CTU) into coding units (CUs).
Figure 2:
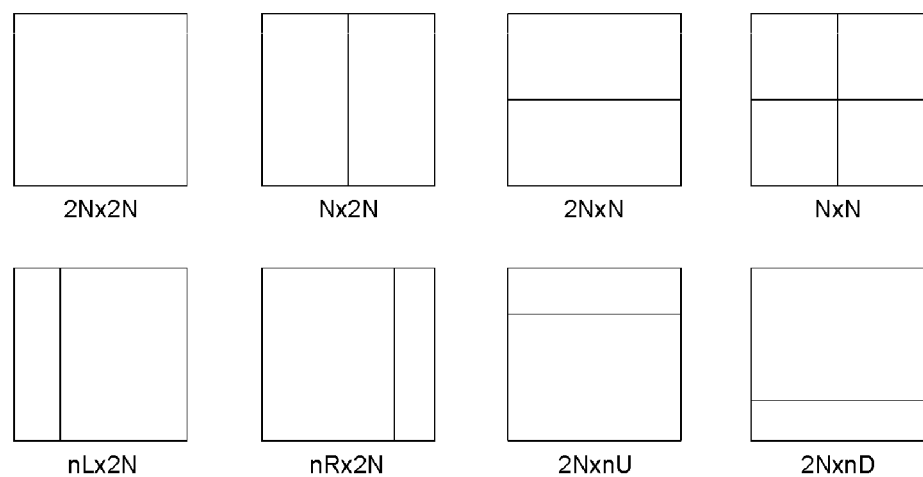
FIG. 2 illustrates asymmetric motion partition (AMP) according to High Efficiency Video Coding (HEVC), where the AMP defines eight shapes for splitting a CU into PU.
Figure 3:
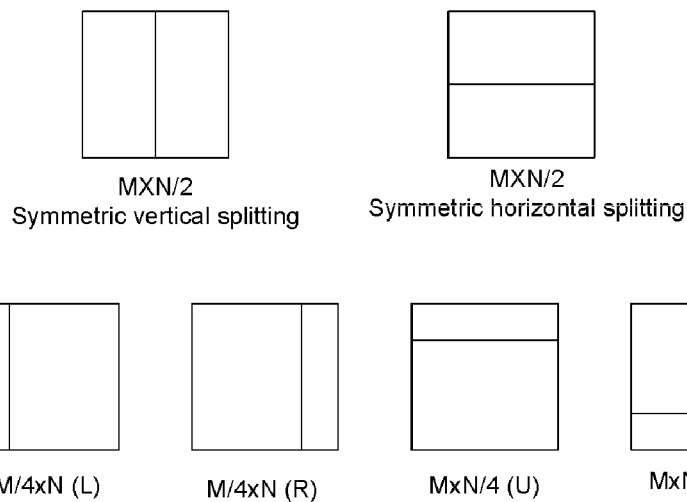
FIG. 3 illustrates an example of various binary splitting types used by a binary tree partitioning structure, where a block can be recursively split into two smaller blocks using the splitting types.
Figure 4:
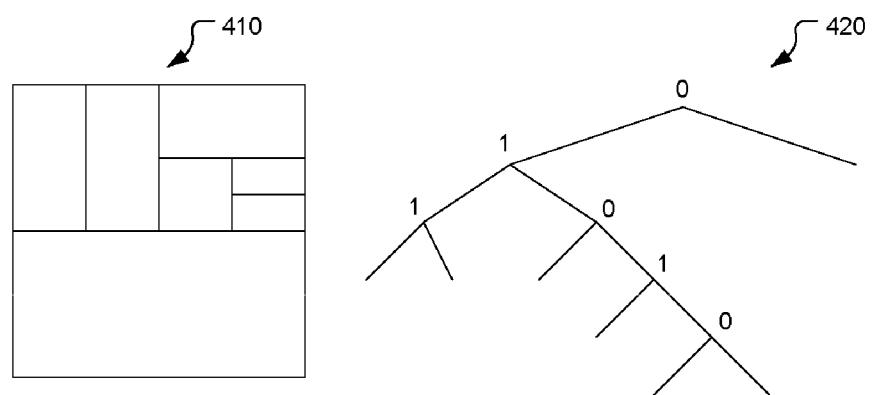
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 5:
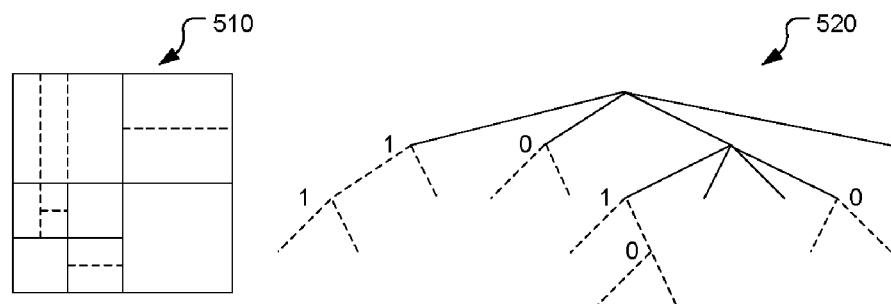
FIG. 5 illustrates an example of block partitioning and its corresponding quad-tree plus binary tree structure (QTBT), where the solid lines indicate quadtree splitting and dotted lines indicate binary tree splitting.
Figure 6:
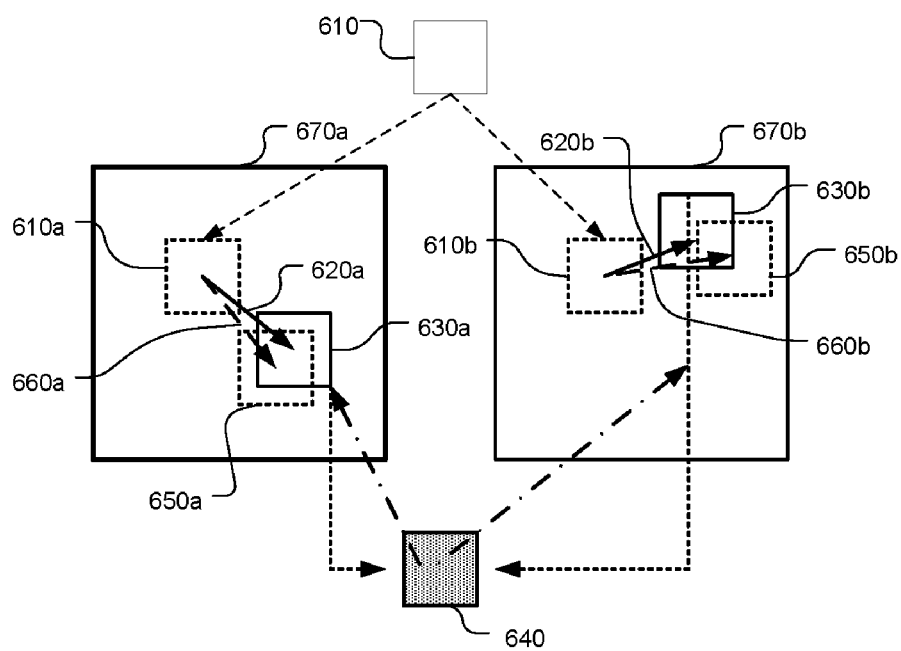
FIG. 6 illustrates an example of the Bilateral Template MV Refinement (BTMVR) process, which is also referred as Decoder-side MV refinement (DMVR) in some literature.
Figure 7:
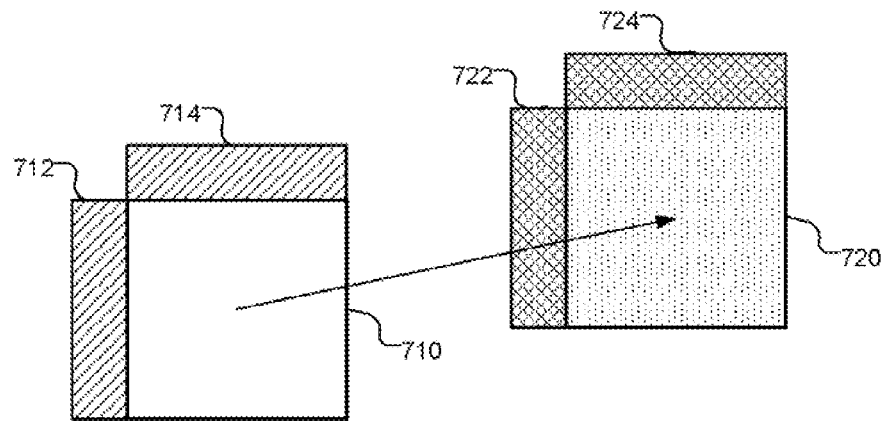
FIG. 7 illustrates an exemplary implementation to derive the offset according to the Neighbouring-derived Prediction Offset (NPO) process.
Figure 8:
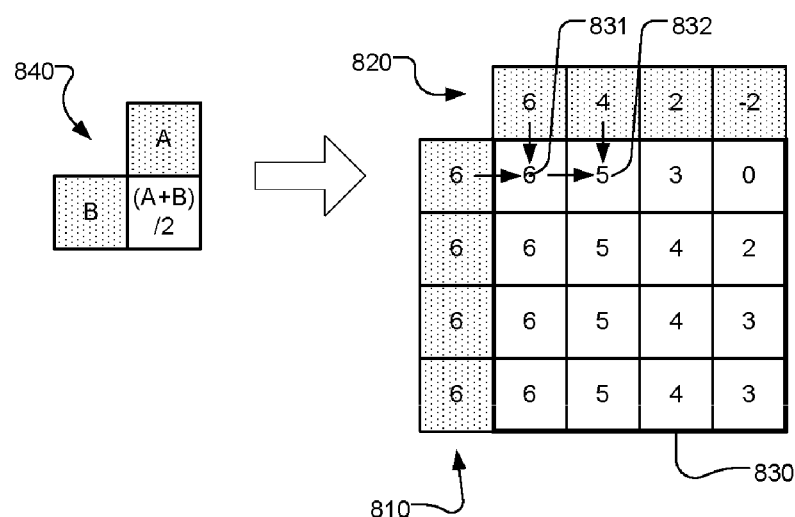
FIG. 8 illustrates another exemplary implementation to derive the offset according to the Neighbouring-derived Prediction Offset (NPO) process.
Figure 9:
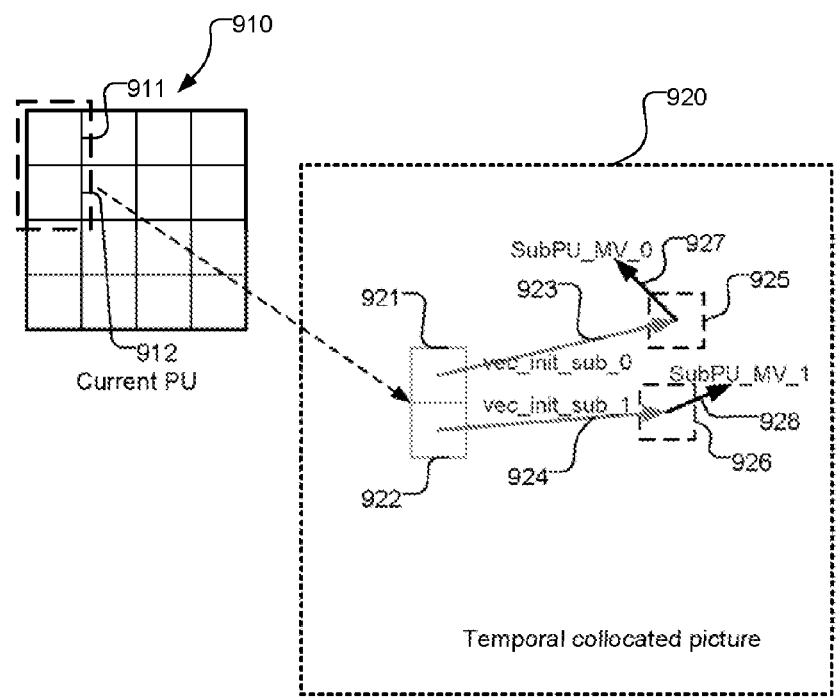
FIG. 9 illustrates an example of the Sub-PU TMVP mode to partition a current PU into multiple Sub-PUs, and find all corresponding temporal collocated motion vectors for each Sub-PU.
Figure 10:
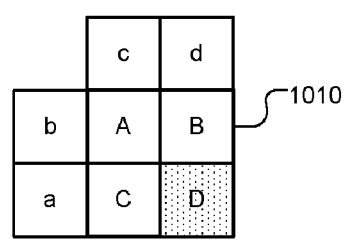
FIG. 10 illustrates the concept of the Spatial-temporal motion vector prediction (STMVP).
Figure 11:
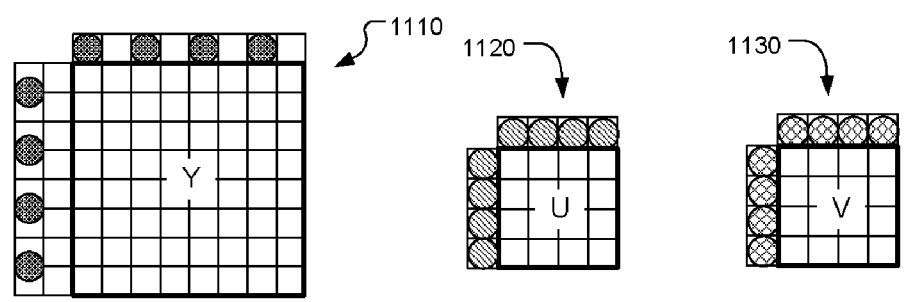
FIG. 11 illustrates an example of the Intra prediction derivation for LM mode.

The following description is of the best-contemplated mode of carrying out the invention. This description is made for the purpose of illustrating the general principles of the invention and should not be taken in a limiting sense. The scope of the invention is best determined by reference to the appended claims.

The use of higher resolution video formats is becoming a trend for various applications. Accordingly, a video compression for higher resolution video formats becomes more important. In the next generation video coding, the CTU size and the maximum TU size are tend to be larger than 64×64 and 32×32 respectively. For example, the CTU size can be 128×128 or 256×256, and the maximum TU size can be 64×64 or 128×128 for luma and 32×32 or 64×64 for chroma component. However, if we want to reuse the HEVC decoder structure (e.g. 32×32 or 64×64 decoder pipeline), some syntax designs or encoding/decoding algorithms may have to be modified to support larger CTU and larger TU.

In the video coding system design for large CTUs, if the CTU size is larger than the maximum TU size, there are two partition methods. One is implicitly splitting the CTU into the CUs with size equal to the maximum TU size or a predefined, derived or signalled size, and then explicitly signalling the CU split syntax. The other one is explicitly signalling the CU split syntax even when the CU size is larger than the maximum TU size. If the leaf CU size is larger than the maximum TU size, in residual coding, the current CU is inferred to be split into multiple TUs with the size equal to the maximum TU size or a predefined, derived or signalled size.

In luma/chroma separate coding, a luma CTB is coded first, and then the chroma CTBs are coded (i.e., the Cb and Cr CTBs). If a luma CTB size is 128×128 or 256×256 and a chroma CTB size is 64×64 or 128×128, the conventional 64×64 pipeline decoder architecture with the capability to process a 64×64 luma texture/residual buffer and/or two 32×32 chroma texture residual buffers in each pipeline stage or each pipeline buffer, is not suitable. For example, a 128×128 luma CU can be partitioned into four 64×64 CUs implicitly and a 64×64 chroma CU can also be partitioned into four 32×32 CUs implicitly. However, in the bitstream, the four luma CUs are signalled sequentially. In the decoder, it cannot receive a 64×64 luma texture/residual and a corresponding 32×32 chroma texture/residual together since the 32×32 chroma texture/residual together is signalled after 4 64×64 luma texture/residual blocks. Therefore, the conventional 64×64 pipeline decoder architecture is not suitable or needs to be modified for luma/chroma separate coding with large CTUs. The CTU is an example of "data unit" used for coding process. Other terms may also be used as data unit in other video coding systems.

In order to reuse the conventional 64×64 (or smaller) pipeline decoder architecture, techniques to reorder the luma/chroma component related syntax (e.g. the residual, quantization level, prediction modes, coding parameters) in an interleaved mannered with an M×N block are disclosed when luma/chroma separate coding is applied. The M×N block can be a predefined or a derived block size, (a 64×64 block in luma sample resolution), a maximum TU size, a size related to maximum/minimum TU size, or a block with area equal to M×N. The M×N can also be signalled in SPS, PPS, slice level, brick level, tile group level, or tile level. The M×N block is also referred as a "working block" in this disclosure for convenience. As is understood, the size of the luma component of the working block is M×N. The size of the chroma component of the working block is dependent on the colour format. For example, for YUV420 format, the size of the chroma (i.e., U or V) block is M/2×N/2. The luma syntaxes within the M×N block are first coded, and then the chroma syntaxes associated with the M×N block are coded. Within this M×N block, the luma and chroma components can have different coding trees (e.g. different block partitions). In this case, the CTU is also referred to use "non-coding-tree-sharing" in this disclosure. In one embodiment, when the separate coding tree is applied, the CTU is inferred to split into multiple M×N blocks/CUs. In one example, the quad-tree split is used for the inferred split. For each M×N block, the luma-component coding tree is first signalled, and then the chroma component coding is signalled.

In one example, if the luma CTB size is 128×128 and the chroma CTBs size is 64×64, and the maximum TU size for luma is 64×64 and for chroma is 32×32, a CTU is inferred to split into four CUs. The four 64×64 luma CUs and four 32×32 chroma CUs are signalled in an interleaved manner. For example, a 64×64 luma CU is followed by a 32×32 chroma CU (including one 32×32 Cb CU and one 32×32 Cr CU), and three pairs of {64×64 luma CU, 32×32 chroma CU} are coded after. The 64×64 luma CU and the 32×32 chroma can be further split into sub CUs. In one embodiment, the concept of luma/chroma separate coding can be still applied. The 64×64 luma CU and the 32×32 chroma CU can have different coding trees. In other words, separate tree partitioning may start at 64×64-luma/32×32-chroma units instead of CTU according to an embodiment of the present invention. For the chroma coding tree, the Cb and Cr component data share the same partition tree. For example, each Intra-slice (I-slice) CTU is first implicitly split into 64×64 luma units and 32×32-chroma units. Then, the coding trees for each 64×64-luma and 32×32-chroma unit are separate, and luma syntax is signalled before chroma syntax within each 64×64 luma unit and 32×32-chroma unit. In one embodiment, in separated chroma coding tree, the minimum chroma CU is 4×4 or minimum chroma CU size/area is 16. The 2×2, 4×2, 2×4 chroma CU is disabled. In one embodiment, the above proposed method is only applied to the I-slice, where the separated coding trees are applied. For inter-slice, the proposed method is not applied.

In one embodiment, one or more syntaxes are signalled at the CTU level to indicate whether the shared coding tree is applied for the whole CTU. If yes, all CU within the CTU uses a shared coding tree. This CTU-level flag can also be applied to an inter slice. If the separate tree is selected, the CTU is an Intra CTU with separate tree coding. All the CUs in this CTU are Intra CU and coded with separate trees. In another embodiment, if the separate tree is selected, the above method is applied. For example, the CTU is inferred split to M×N blocks. The separate tree coding is applied for each M×N block.

In another embodiment, the large CU (CU with size larger than M×N) can be selected. The CTU don't have to be inferred to split into multiple M×N blocks. The size of the M×N block can be a predefined or a derived block size, equal to maximum TU size, a size related to maximum/minimum TU size, or a block with area equal to M×N. The M×N can also be signalled in SPS, PPS, slice level, brick level, tile group level, or tile level. In this embodiment, the CU split syntax is signalled in the CTU-level. If the CU size is larger than the M×N, the shared coding tree is used. If the CU size is equal to the M×N block, the separate coding tree is applied. In one example, the luma CTB size is 128×128 and the chroma CTBs size is 64×64, and the maximum TU size for luma is 64×64 and for chroma is 32×32. The CU split syntaxes are signalled at CTU-level. If the leaf CU is larger than 64×64 (e.g 128×128 CU), the CU is divided into several TUs according to the inferred split or the signalled TU split syntax for residual coding. The TU size shall be equal to or smaller than the maximum TU size. For each TU, the luma coefficients are signalled first and then the chroma coefficients are signalled.

If the CU size is larger than 64×64, the shared coding tree is applied. For example, in 128×128 CU, if the split flag is true or the split syntax indicates the CU is split, the luma CU and chroma CU are split at the same time with same split partition. In other words, the luma CU and the chroma CU share the same coding tree. It is also referred as the CU uses a "shared coding tree" or the CU uses "coding-tree sharing". When the CU size is equal to 64×64, the separate coding tree is applied. Under this 64×64 block, the 64×64 luma CU and the 32×32 chroma CU can have different coding trees. In other words, separate tree partitioning can start at 64×64-luma/32×32-chroma units instead of CTU according to this embodiment. For blocks larger than 64×64, the shared coding tree is applied.

In one embodiment, in separate chroma coding tree, the minimum chroma CU is 4×4 or minimum chroma CU size/area is 16. The 2×2, 4×2, 2×4 chroma CU is disabled. In one embodiment, the method proposed above is only applied to the I-slice, where the separate coding trees are applied. For inter-slice, the method proposed above is not applied. In one embodiment, one or more syntaxes are signalled at the CTU level to indicate whether the coding-tree-sharing is applied for the whole CTU. If yes, all CUs within the CTU use the shared coding tree. In other words, the luma and chroma components within each CU of the CTU share a coding tree.

In another embodiment, for I-slice coding, the shared coding tree is applied as a default. The split syntaxes are signalled started at the CTU level. When the CU size is larger than M×N, the shared coding tree is applied. If the CU size is equal to M×N, one or more shared/separate coding tree syntaxes (also named shared-separate syntaxes) are signalled. The M×N block can be a predefined or a derived block size, equal to maximum TU size, or a size related to maximum/minimum TU size. The M×N can also be signalled in SPS, PPS, slice level, brick level, tile group level, or tile level. If the coding-tree sharing is selected, the luma and chroma CU partitions within this M×N use the shared coding tree. If non-coding-tree-sharing is applied, the luma and chroma CU partitions within this M×N use the separate coding tree. Otherwise, the share tree is used for this M×N region. The M×N cannot be larger than the maximum TU size.

In one embodiment, one or more syntaxes are signalled at the CTU level to indicate whether the coding-tree-sharing is applied for the whole CTU. If yes, all CUs within the CTU use the coding-tree-sharing. In another embodiment, one or more syntaxes are signalled at the CTU level to indicate whether all Intra regions of this CTU use the coding-tree-sharing or not. If yes, all Intra regions within the CTU use shared coding trees. In another embodiment, one or more syntaxes are signalled at the CTU level to indicate whether all Intra regions within the M×N size of this CTU use the coding-tree-sharing or not. If yes, all Intra regions within the M×N size within the CTU use the coding-tree-sharing. In this case, the luma and chroma components in each region share a coding tree. Otherwise, all Intra regions within the M×N size within the CTU use the non-coding-tree-sharing. In one embodiment, in separate chroma coding tree, the minimum chroma CU is 4×4.

In another embodiment, for I-slice coding, the shared coding trees are applied as a default. The split syntaxes are signalled at the CTU level. If the CU stops split and the CU size is equal to or smaller than M×N, one or more shared/separate coding tree syntaxes (also named shared-separate syntaxes) are signalled in each leaf CU. The M×N block can be a predefined or a derived block size, or equal to maximum TU size, or a size related to maximum/minimum TU size. The M×N can also be signalled in SPS, PPS, slice level, brick level, tile group level, or tile level. In this embodiment, the CU split syntax is signalled at the CTU level. When the shared coding trees are selected, it implied an Intra leaf CU. If the separate coding tree is applied, the split syntaxes and separated luma/chroma CU coding are signalled after the one or more shared/separate coding tree syntaxes. In one example, if the separate coding tree (i.e., non-coding-tree-sharing) is selected, the first luma CU is inferred to split. In this case, only the split mode is signalled. In another example, if the luma CU is not split, the chroma CU is inferred as split. In this case, only the split mode is signalled. In one embodiment, if the CU size is equal to or smaller than O×P, the separate coding tree syntaxes are not signalled. The shared coding trees are inferred to be applied. The O×P can be predefined or signalled in SPS, PPS, slice level, brick level, tile group level, or tile level. For the leaf CU size larger than M×N, the shared coding trees are applied. The proposed method can also be applied in Inter-slice coding. In one embodiment, one or more syntaxes are signalled at CTU level to indicate whether the shared coding tree is applied for the whole CTU. If yes, all CU within the CTU uses shared coding tree. In another embodiment, one or more syntaxes are signalled at the CTU level to indicate whether all Intra regions of this CTU use the shared coding tree or not. If yes, all Intra regions within the CTU use the shared coding tree (i.e., coding-tree-sharing). In another embodiment, one or more syntaxes are signalled at CTU level to indicate whether all Intra regions within the M×N size of this CTU use the shared coding tree (i.e., coding-tree-sharing) or not. If yes, all Intra regions within the M×N size within the CTU use separate coding tree (i.e., non-coding-tree-sharing). In one embodiment, in separated chroma coding trees, the minimum chroma CU is 4×4 or the minimum chroma CU size/area is 16 samples.

In another embodiment, the CTU size for the I-slice with separate coding trees is constrained to be no larger than M×N. The M×N can be a predefined or a derived block size, equal to maximum TU size, or a size related to maximum/minimum TU size. The M×N can also be signalled in SPS, PPS, slice level, brick level, tile group level, or tile level. For Inter-slice, the CTU size can be unconstrained to be smaller than or equal to M×N. For example, the CTU size can be larger than M×N in Inter-slice.

In the present invention, the separate coding tree can also be applied to the Inter-slice. The separate coding tree is applied to the Intra coded CU that the CU size is equal to or smaller than M×N. The M×N block can be a predefined or a derived block size, equal to maximum TU size, or a size related to maximum/minimum TU size. The M×N can also be signalled in SPS, PPS, slice level, brick level, tile group level, or tile level. When the CU is larger than M×N, the shared coding trees are applied. If the split flag is true or the split syntax indicates the CU is split, the luma CU and chroma CU are split at the same time with same partition.

When the CU is equal to M×N, a syntax is signalled to indicate whether the separate coding tree (i.e., non-coding-tree-sharing) is applied to this M×N block or not. In one example, the separate coding tree is only for the Intra CU. If the M×N block selects to use the separate coding tree, the prediction modes of the CUs inside of the M×N are all inferred as the Intra mode. In another example, the separate coding tree is applied to the Intra region within this M×N region. If the M×N block selects to use the separate coding tree, the Intra coded block within this M×N region is inferred as using separate coding tree. In another embodiment, one or more syntaxes are signalled at the CTU level to indicate whether all Intra regions of this CTU use shared coding tree. If yes, all Intra regions within the CTU use shared coding tree. In another embodiment, one or more syntaxes are signalled at the CTU level to indicate whether all Intra regions within the M×N size of this CTU use the shared coding tree. If yes, all Intra regions within the M×N size within the CTU use separate coding tree. In another embodiment, one or more syntaxes are signalled at the CTU level to indicate whether all Intra regions within the M×N size of this CTU use Intra coding and use separate tree coding. If yes, all CUs within the CTU use Intra mode coding, and within each M×N block, the separate tree coding is applied. In one example, the CTU which selects the separate tree coding is inferred to split into multiple M×N blocks. The QT-split can be used. In one embodiment, for a separated chroma coding tree, the minimum chroma CU is 4×4.

In another embodiment, when the CU is larger than M×N, the shared coding tree is applied. If a leaf CU is larger than M×N, no separate coding tree (e.g. shared coding tree) is applied. In residual coding, the CU is inferred to split into TUs. In one example, when the CU is not further split, the prediction mode is signalled. If the Intra mode is selected and the CU size is equal to or smaller than M×N, one or more further split syntaxes are signalled. If the CU is further split, the separate coding tree is applied. In one example, the signalled split syntax is for the luma component. If the CU is not further split, it is an Intra leaf CU. In another example, when the CU is not further split, the prediction mode is signalled. If the Intra mode is selected and the CU size is equal to or smaller than M×N, one or more separate coding tree syntaxes (also named shared-separate syntaxes) are signalled to indicate whether this CU use separate coding tree or not. If no, it's an Intra leaf CU. If yes, the separate coding tree is applied. Under this CU, the luma component and the chroma component can have different coding trees. The luma component syntax is signalled before the chroma component syntax. All the sub-CUs within this CU are all inferred as the Intra mode or non-Inter mode. The separate coding tree syntax (e.g. a flag indicating whether the separate coding being applied) is not signalled and inferred as not applied when the CU size is larger than M×N or the prediction mode is an Inter mode (or an Intra block copy mode). In one example, if the separate coding tree is selected, the first luma CU is inferred split. In this case, only the split mode is signalled. In another example, if the luma CU is not split, the chroma CU is inferred as split. In this case, only the split mode is signalled. In another example, the separate coding tree is always applied when the Intra mode is selected and the CU size is equal to or smaller than M×N. In this CU, the split syntaxes are always signalled except that the CU is the smallest CU. If the leaf CU size is larger than M×N and is Intra coded, for residual coding, the CU is divided into multiple TUs (e.g. via inferred split or signalling the TU split syntax) so that the TU size shall be equal to or smaller than the maximum TU size. For each TU, the luma coefficients are signalled, and then the chroma coefficients are signalled.

In one embodiment, if the CU size is equal to or smaller than O×P, the separate coding tree syntaxes (also named shared-separate syntaxes) are not signalled. The shared coding tree is inferred to be applied. The O×P can be predefined or signalled in SPS, PPS, slice level, brick level, tile group level, or tile level. In one embodiment, in separated chroma coding tree, the minimum chroma CU is 4×4. In one embodiment, one or more syntaxes are signalled at the CTU level to indicate whether the shared coding tree is applied for the whole CTU. If yes, all CU within the CTU uses shared coding tree. In another embodiment, one or more syntaxes are signalled at CTU level to indicate whether all Intra regions of this CTU use shared coding tree or not. If yes, all Intra region within the CTU uses separate coding tree. In another embodiment, one or more syntaxes are signalled at the CTU level to indicate whether all Intra regions within the M×N size of this CTU use shared coding tree. If yes, all Intra regions (e.g. a leaf CU with size smaller than or equal to M×N and with intra mode) within the M×N size within the CTU use separate coding tree (i.e., non-coding-tree-sharing). In another embodiment, one or more syntaxes are signalled at CTU level to indicate whether the CTU is an Intra CTU with separate tree coding. If yes, all the CUs in this CTU are Intra CUs and coded with the separate tree.

In yet another embodiment, when the CU is larger than M×N, the shared coding tree is applied. The CU split syntaxes is signalled format the CTU-level. If the CU is not further split and the leaf CU is larger than M×N, the prediction mode is inferred as an Inter mode, or the Intra mode cannot be selected (e.g. a bitstream conformance preventing the Intra mode from being selected). If the CU stops splitting and the leaf CU is equal to or smaller than M×N, the prediction mode is signalled or derived. If the Intra mode is selected and the CU size is equal to or smaller than M×N, one or more separate coding tree syntaxes (also named shared-separate syntaxes) are signalled to indicate whether this Intra CU uses separate coding tree. If no, this CU is designated as an Intra leaf CU (i.e., no further splitting). If yes, the separate coding tree (i.e., non-coding-tree-sharing) is applied. Under this CU, the luma component and the chroma component can have different coding trees. The luma component syntax is signalled before the chroma component syntax. All the sub-CUs within this CU are all inferred as an Intra mode. The separate coding tree syntax (e.g. a flag indicating whether the separate coding being applied) is not signalled and inferred as not applied when the CU size is larger than M×N or the prediction mode is an Inter mode.

In one example, if the separate coding tree is selected, the first luma CU is inferred as split. In this case, only the split mode is signalled. In another example, if the luma CU is not split, the chroma CU is inferred as split. Only the split mode is signalled. In another example, the separate coding tree (i.e., non-coding-tree-sharing) is always applied when the Intra mode is selected and the CU size is equal to or smaller than M×N. In this CU, the split syntaxes are always signalled except for the case that the CU is the smallest CU. In one embodiment, if the CU size is equal to or smaller than O×P, the separate coding tree syntaxes (also named shared-separate syntaxes) are not signalled. The shared coding tree is inferred to be applied. The O×P can be predefined or signalled in SPS, PPS, slice level, brick level, tile group level, or tile level. In one embodiment, one or more syntaxes are signalled at the CTU level to indicate whether the shared coding tree is applied for the whole CTU. If yes, all CUs within the CTU use the shared coding tree. In one embodiment, in a separated chroma coding tree, the minimum chroma CU is 4×4. In another embodiment, one or more syntaxes are signalled at the CTU level to indicate whether all Intra regions of this CTU use the shared coding tree or not. If yes, all Intra regions within the CTU use the separate coding tree. In another embodiment, one or more syntaxes are signalled at the CTU level to indicate whether all Intra regions within the M×N size of this CTU use a shared coding tree. If yes, all Intra regions within the M×N size within the CTU use separate coding tree. In one embodiment, in the separated chroma coding tree, the minimum chroma CU is 4×4.

In yet another embodiment, for Inter-slice coding, one or more separate tree syntaxes are signalled in an M×N block level. The M×N block can be a predefined or a derived block size, equal to maximum TU size, or a size related to maximum/minimum TU size. The M×N can also be signalled in SPS, PPS, slice level, brick level, tile group level, or tile level. If the share tree coding is select, all the CUs in this M×N region use the share tree coding. If the separate tree coding is selected, the Intra CU within the M×N region use the separate tree coding. For example, within this M×N region, if the CU stop split, the Inter/Intra mode is signalled. If the CU is in the Intra mode and the separate tree coding is applied, the further split syntaxes for luma and chroma component are signalled. Note that, the QT/BTT constraint can be still applied. If the Intra CU is spit by BT or TT partition, the luma and chroma coding tree can only be further split using BT and/or TT partition. In another example, if the Intra CU is spit by BT or TT partition, the luma and chroma coding tree can be further split using QT, BT and/or TT partition. If the separate tree coding is selected, in the separate chroma coding tree, the minimum chroma CU is 4×4.

In yet another embodiment, for Inter-slice coding, one or more separate tree syntaxes are signalled in the CTU level. If the shared coding tree is selected, all the CUs are coded using share tree coding. If the separate tree coding (i.e., non-coding-tree-sharing) is select, the Intra CUs in this CTU use the separate tree coding. In another example, if the separate tree coding is select, the Intra CU within the CTU use the separate tree coding, except for the Intra CU with the size larger than M×N. For example, when the Intra CU with the size larger than M×N is coded using the shared coding tree, the Intra CU is actually a leaf Intra CU. The Intra CU is split into one or more TUs. The size of the TUs shall be smaller than M×N. The M×N block can be a predefined or a derived block size, or equal to maximum TU size, or a size related to maximum/minimum TU size. The M×N can also be signalled in SPS, PPS, slice level, brick level, tile group level, or tile level. For example, if the CU stop splitting, the Inter/Intra mode is signalled. If the CU is an Inter coded CU or an Intra coded CU and the size is larger than the M×N, it uses the share tree coding (i.e., coding-tree-sharing). If the CU is an Intra coded CU and the size is smaller than or equal to M×N and the separate tree coding is selected for this CTU, the further split syntaxes for the luma and chroma component are signalled. Note that, the QT/BTT constraint can still be applied. If the Intra CU is spit by BT or TT partition, the luma and chroma coding tree can only be further split using BT and/or TT partition. In another example, if the Intra CU is spit by BT or TT partition, the luma and chroma coding tree can be further split using QT, BT and/or TT partition. If the separate tree coding is selected, in the separated chroma coding tree, the minimum chroma CU is 4×4.

In another embodiment, in I-slice coding, if the luma CTB size is 128×128 and the chroma CTBs size is 64×64, and the maximum TU size for luma is 64×64 and for chroma is 32×32, the CU split is explicitly signalled even when the CU size is larger than the maximum TU size (e.g. signalling a split flag in 128×128 luma CU and 64×64 chroma CU). If the 128×128 luma CU is split into four 64×64 CUs, after coding the first 64×64 CU, the chroma component is encoded/decoded. The first 64×64 CU can be further split into sub-CUs. If the 64×64 chroma CU is also split into four 32×32 CUs, the first 32×32 chroma CU is encoded/decoded. The first 32×32 chroma CU can also be further split into sub-CUs. After encoding/decoding the first 32×32 chroma CU, the second 64×64 luma CU is encoded/decoded and the second 32×32 chroma CU, and so on. If the 128×128 luma CU is split into four 64×64 CUs but the 64×64 chroma is not split into sub-CUs (the chroma TU being inferred to four 32×32 TUs), an embodiment of the present invention encodes/decodes the first 64×64 luma CU, then encodes/decodes the mode information of the 64×64 chroma CU and the first 32×32 chroma TU. After encoding/decoding the first 32×32 chroma TU, the second 64×64 luma CU is encoded/decoded and the second 32×32 chroma TU, and so on.

The similar concept can be applied when the 128×128 luma CU is not split but the 64×64 chroma CU is split. It encodes/decodes the mode information of 128×128 luma CU and the first 64×64 luma TU first, and then encodes/decodes the split syntax of the 64×64 chroma CU and the first 32×32 chroma CU. After encoding/decoding the first 32×32 chroma CU, the second 64×64 luma TU is encoded/decoded and the second 32×32 chroma CU, and so on. In another example, if the 128×128 luma CU and 64×64 chroma CU is not split, the split syntax and the mode information of the 128×128 luma CU is first encoded/decoded, and then the first 64×64 luma TU is encoded/decoded. Then the split syntax and the mode information of the 64×64 chroma CU and the first 32×32 chroma CU are encoded/decoded. After encoding/decoding the first 32×32 chroma TU, the second 64×64 luma TU is encoded/decoded and the second 32×32 chroma TU, and so on. The proposed method in this paragraph and the above paragraph can also be applied to the Inter-slice. In Inter-slice coding, for each CU (not limited to be the leaf CU), one or more separate coding tree syntaxes are signalled at the CTU-level. If the separate coding tree is applied, the proposed method in this paragraph and the above paragraph is applied. All the sub-CUs in this CU can be inferred as the Intra mode. In one embodiment, one or more syntaxes are signalled at the CTU level to indicate whether the shared coding tree is applied for the whole CTU. If yes, all CUs within the CTU use (i.e., coding-tree-sharing).

In yet another embodiment, for Inter-slice coding, whether to use the separate tree is determined in an M×N block level. The M×N block can be a predefined or a derived block size, or equal to maximum TU size, or a size related to maximum/minimum TU size, or equal to CTU size. The M×N can also be signalled in SPS, PPS, slice level, brick level, tile group level, or tile level. When encoding/decoding the CU partition from CTU-level, when coding an Intra coded leaf CU with the CU size (area, width or, height) equal to or larger than M×N, one or more separate tree syntaxes are signalled. If the separate tree is selected, the region of this Intra CU is using separate tree coding. The further luma/chroma split syntaxes are signalled. When the CU partitioning reaches an M×N region, a syntax corresponding to the use of a separate tree is set to false. When coding an Intra-coded leaf CU with the CU size (e.g. area, width or, height) smaller than M×N and the syntax representing the use of a separate tree is equal to false, one or more separate tree syntaxes are signalled. If the separate tree is selected, the Intra CUs in this M×N region are using separate tree coding. The further luma/chroma split syntaxes are signalled for the Intra CUs, and the syntax representing the use of separate tree is set equal to true. No another separate tree syntax can be signalled in this M×N region. In another word, the separate tree syntax in an M×N region can be only signalled once. The signalled syntaxes are shared for all CUs in this M×N region. If the share tree coding is selected, all the CUs in this M×N region use the shared tree coding. If the separate tree coding is selected, the Intra CU in this M×N region use the separate tree coding. Note that, the QT/BTT constraint can still be applied. If the Intra CU is spit by BT or TT partition, the further split of luma and chroma coding tree can only use the BT and/or TT partition. In another example, if the Intra CU is spit by BT or TT partition, the further split of luma and chroma coding tree can use QT, BT and/or TT partition. If the separate tree coding is selected, in the separated chroma coding tree, the minimum chroma CU is 4×4.

In one embodiment, the separate coding tree cannot be applied to the block with the block size larger than M×N. The M×N block can be a predefined or a derived block size, equal to maximum TU size, or a size related to maximum/minimum TU size. The size information related to M×N can also be signalled in SPS, PPS, slice level, brick level, tile group level, or tile level. In another embodiment, the separate coding tree can only be applied to the block with the block size equal to or smaller than M×N. The M×N block can be a predefined or a derived block size, equal to maximum TU size, or a size related to maximum/minimum TU size. The M×N can also be signalled in SPS, PPS, slice level, brick level, tile group level, or tile level. When the CU size is larger than M×N, the shared coding tree partitioning is applied.

In the original design of separate partitioning for luma and chroma, the shapes of luma and chroma blocks can be different, and hence a luma block can extend across different chroma blocks and vice versa. One consequence is that luma and chroma blocks must be processed separately, and the buffered samples for prediction and reconstruction might need to be kept in memory until the entire unit has been processed. On the other hand, if, for example, all luma blocks do not extend across different chroma blocks (i.e., each luma block being entirely inside a chroma block), then after processing a specific chroma block and the luma blocks within, the buffered samples for processing this block can be discarded. To achieve this, we can apply the same partitioning to both luma and chroma several times, and then disable further splitting for one of the components. Whether to disable further splitting can be explicitly signalled or implicitly derived from the size or depth of the current block.

In one embodiment, a flag called chroma_split_end is signalled before or after each luma split flag, indicating whether chroma partitioning terminates at this point, and the subsequent splits will be applied only to the luma component. Before the chroma_split_end is true, the chroma partition is the same as the luma partition. The chroma_split_end flag can be used to indicate that the corresponding split flag represents the last partitioning applied to the chroma component, or that the corresponding split flag and subsequent split flags are not applicable to the chroma component. In one example, when reaching the luma leaf CU and the chroma partition is not terminated (e.g. the chroma_split_end being all false), the chroma_split_end is inferred as true, which means the chroma component is not split anymore. In another example, when the luma partition reaches the luma leaf CU and the chroma partition is not terminated, the chroma_split syntax is applied. The chroma component can be further partitioned into smaller CUs. The chroma_split_end can be signalled or inferred when luma component is coding quad-tree split, binary-tree split, or ternary-tree split. In one example, the chroma_split_end can be signalled or inferred when luma component is coding quad-tree split. If the QT split is before the BT and/or TT split, it means when luma component is doing QT-split, the chroma component needs to follow the QT split or stop the split. When the luma component is doing BT/TT-split, the chroma is free to using BT/TT split. In another example, the chroma QT-split can be stopped before the luma QT leaf CU, and the chroma QT leaf CU can be further split by using BT/TT split.

In another embodiment, a flag called luma_split_end is signalled before or after each split flag to indicate whether luma partitioning terminates at this point. The subsequent splits will be applied only to the chroma component. The luma_split_end flag can be used to indicate that the corresponding split flag represents the last partitioning applied to the luma component, or that the corresponding split flag and subsequent split flags are not applicable to the luma component. In one example, when reaching the chroma leaf CU and the luma partition is not terminated (e.g. the luma_split_end being all false), the luma_split_end is inferred as true, which means the luma component is not split anymore. In another example, when the chroma partition reaches the chroma leaf CU and the luma partition is not terminated, the luma_split syntax is applied. The luma component can be further partitioned into smaller CUs. One can also employ both chroma_split_end and luma_split_end flags aforementioned in some embodiments.

The QT-depth and BT/TT-depth concept can be used. When a CU is split by QT/BT/TT partition, the QT-depth/BT-depth/TT-depth is increased by 1. The BT-depth and TT-depth can be merged into a CT-depth (coding-tree-depth). For example, when a CU is split by BT or TT partition, the CT-depth is increased by 1. In one embodiment, the chroma QT-depth cannot be larger than the luma QT-depth plus a threshold. The threshold can be zero, a positive value, or a negative value. In an example with the threshold equal to zero, if the QT-depth of its corresponding luma block is 2, then the maximum QT-depth of the chroma CU cannot be larger than 2. The constraint can be applied by the syntax constraint, for example, no QT-split syntax when the chroma QT-depth is reaching the maximum QT-depth, or can be applied by the encoder constraint, for example, a bitstream conformance requirement that the chroma QT-depth shall not be larger than the maximum QT-depth. The similar constraint can be applied to BT-depth/TT-depth/CT-depth, or the total depth. For example, the chroma QT-depth+CT-depth cannot be larger than the QT-depth+CT-depth of its corresponding luma block plus a threshold. In one example, it only constrains the chroma-QT-depth. The chroma BT/TT/CT-depth is independent to its corresponding luma CU.

In another embodiment, the similar concept of using syntax of chroma_split_end can be implemented by using another syntax design. For example, the luma coding tree is first encoded or decoded. When coding the luma leaf CU or after coding the luma leaf CU, a syntax is encoded/parsed to indicate the chroma leaf CU size. The syntax can be related to the partition depth (e.g. QT-depth, BT-depth, TT-depth, CT-depth, and/or total-depth). For example, syntax, chroma_depth_above can be used. If the chroma_depth_above is equal to 0, it means the chroma CU and luma CU using the same partition and have the same CU size. For the 4:2:0 format, the same CU size means that the actual chroma CU size is ¼ of the actual luma CU size. If the chroma_depth_above is larger than 0 (e.g. K, K>0) it means the chroma CU partition is stopped before depth K. For example, if a luma leaf CU has QT-depth equal to 3 and CT-depth equal to 0, the maximum CTU size is 128, and the size of this luma leaf CU is 16×16. If the chroma_depth_above is equal to 1, it means the chroma CU size is 32×32. The QT-depth of the chroma CU is 2. In this example, the chroma_depth_above syntax is not signalled for the following luma leaf CU if the chroma_depth_above is signalled in this 32×32 area. For example, for the following 3 luma QT CUs with size equal to 16×16 (not necessarily a leaf CU), the chroma_depth_above syntax is not signalled. The first luma leaf CU in the next 32×32 area, the chroma_depth_above syntax is signalled. The chroma CU syntax can be signalled after the first luma leaf CU or after the 32×32 area (32×32 area is an example based on the example chroma_depth_above value described above).

In another embodiment, the chroma LM mode is take into consideration. Since the LM mode is a powerful coding tool to compress the chroma component data, the LM mode syntax short cut can be applied with the method we presented above. For example, the LM syntax can be applied when the chroma_split_end equal to 1 or when the chroma_depth_above is signalled.

In another embodiment, the adaptive chroma mode syntax is proposed. The chroma mode syntax can be the Intra prediction mode related syntax, motion information or transform/residual related syntax. The chroma syntax order/ codeword can be different when the chroma CU size or depth is smaller than, equal to, or larger than the corresponding luma CU size or depth. For example, if the chroma CU size is smaller than the corresponding luma CU size or if the chroma CU depth is larger than the corresponding luma CU depth, the DM mode syntax is move backward. For example, move the DM mode candidate backward in most probable mode list or move the DM mode syntax after the normal syntax position.

In another embodiment, one can specify, in high-level syntax such as SPS, PPS, VPS, or slice-header, the maximum partition depth or the minimum block size for which unified partitioning for luma and chroma is allowed. Once the partition depth exceeds the maximum depth, or the block size becomes smaller than the minimum size, only one of the luma and chroma components is allowed to be further split. In another embodiment, if the partition depth is smaller than the maximum partition depth or the block size is larger than the minimum block size, the unified partitioning for luma and chroma is applied. Once the partition depth exceeds the maximum depth, or the block size becomes smaller than the minimum size, the separate luma/chroma coding tree is applied.

In another embodiment, the luma CU structure and chroma CU structure should have some correlation in terms of coding unit splitting. To reduce the encoding runtime and improve the coding efficiency, the chroma CU split should follow the luma CU split, but the chroma CU split can be early terminated or can be further split. For example, if the corresponding luma CU is using QT split/BT vertical split/ BT horizontal split, the chroma CU has two options. One is to follow the luma split type, and the other one is not split. If the corresponding luma CU is not split, the chroma CU can be further split, or in one embodiment, the chroma CU cannot be split. The early termination flag or following split flag can be inferred under some constraint. For one example, the first K layers, the chroma CU split always follows the luma CU split. In another example, when CU size is larger than M×N, the chroma CU split always follows the luma CU split. In another example, the chroma QT split always follows the luma QT split. The early stop flag is only for BT split.

The constraint can be adaptive. For example, the K, M, and N can be derived by the decoded CUs or the neighbouring CUs.

In another embodiment, the proposed guided CU split is only applied when the chroma CU and luma CU have the same QT depth, which means the chroma BT split follows luma BT split if their QT leaf-CUs are the same size.

In another example, the chroma QT split always follows the luma QT split (i.e., sharing the same QT split), but there is no constraint for the BT split.

Note that, in this invention, the 4:2:0 chroma format is used. Therefore, for a 64×64 luma block, its corresponding chroma block is 32×32. All the description is based on this chroma format. The proposed methods can also be applied for different chroma formats, such as 4:4:4, 4:2:2, 4:0:0. In this invention, one or more methods can be applied together.

Any of the foregoing proposed methods can be implemented in encoders and/or decoders. For example, any of the proposed methods can be implemented in an entropy encoding module or a block partition module in an encoder, and/or an entropy parser module or a block partition module in a decoder. Alternatively, any of the proposed methods can be implemented as a circuit coupled to the entropy encoding module or the block partition module in the encoder, and/or the entropy parser module or the block partition module in the decoder, so as to provide the information needed by the entropy parser module or the block partition module.

Figure 12:
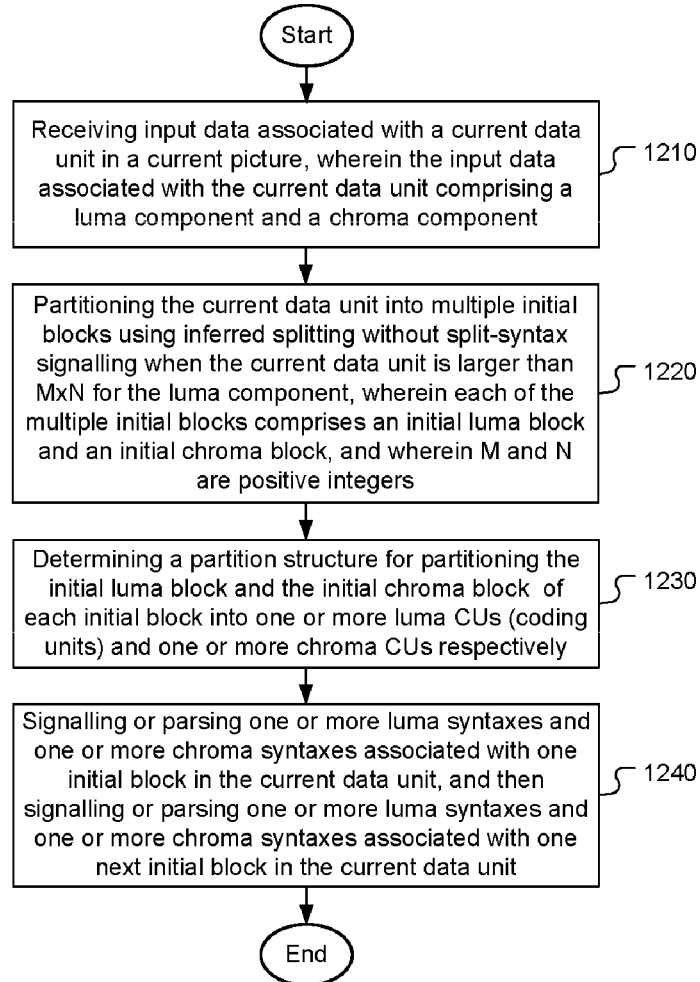
FIG. 12 illustrates a flowchart of an exemplary coding system with the block partition according to an embodiment of the present invention.

FIG. 12 illustrates a flowchart of an exemplary coding system with the block partition according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current data unit in a current picture are received in step 1210, where the input data associated with the current data unit comprise a luma component and a chroma component. The current data unit is partitioned into multiple initial blocks using inferred splitting without split-syntax signalling when the current data unit is larger than M×N for the luma component in step 1220, where each of the multiple initial blocks comprises an initial luma block and an initial chroma block, and wherein M and N are positive integers. A partition structure is determined for partitioning each initial luma block and each initial chroma block into one or more luma CUs (coding units) and one or more chroma CUs respectively in step 1230. One or more luma syntaxes and one or more chroma syntaxes associated with one initial block in the current data unit are signalled or parsed, and then one or more luma syntaxes and one or more chroma syntaxes associated with one next initial block in the current data unit are signalled or parsed in step 1240.

Figure 13:
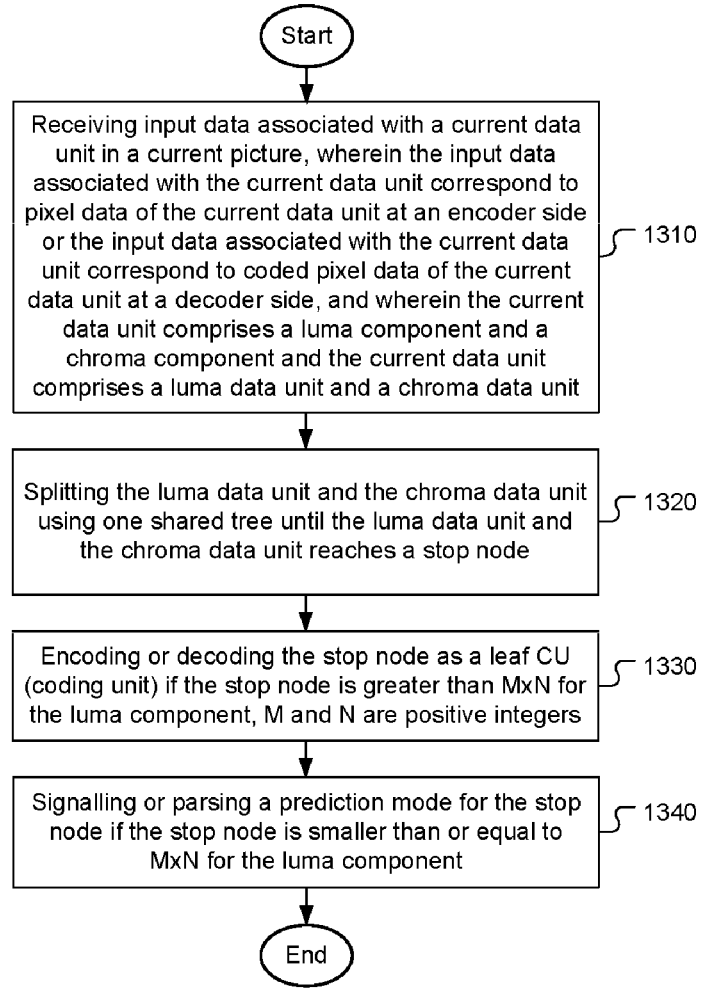
FIG. 13 illustrates a flowchart of another exemplary coding system with the block partition according to an embodiment of the present invention.

FIG. 13 illustrates a flowchart of another exemplary coding system with the block partition according to an embodiment of the present invention. According to this method, input data associated with a current data unit in a current picture are received in step 1310, where the input data associated with the current data unit correspond to pixel data of the current data unit at an encoder side or the input data associated with the current data unit correspond to coded pixel data of the current data unit at a decoder side, and where the current data unit comprises a luma component and a chroma component and the current data unit comprises a luma data unit and a chroma data unit. The luma data unit and the chroma data unit are split using one shared tree until the luma data unit and the chroma data unit reaches a stop node in step 1320. If the stop node is greater than M×N for the luma component, the stop node is encoded or decoded as a leaf CU (coding unit) in step 1330, where M and N are positive integers. If the stop node is smaller than or equal to M×N for the luma component, a prediction mode is signalled or parsed for the stop node in step 1340.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding used by a video coding system, the method comprising:
   receiving input data associated with a current data unit in a current picture, wherein the input data associated with the current data unit correspond to pixel data of the current data unit, and wherein the current data unit comprises a luma component and a chroma component and the current data unit comprises a luma data unit and a chroma data unit;
   splitting the luma data unit and the chroma data unit using one shared tree until the luma data unit and the chroma data unit reach a stop node;
   encoding or decoding the stop node as a leaf CU (coding unit) if the stop node is greater than M×N for the luma component, M and N are positive integers; and
   signalling or parsing a prediction mode for the stop node if the stop node is smaller than or equal to M×N for the luma component.

2. The method of claim 1, wherein if the prediction mode for the stop node corresponds to an Intra mode or a non-Inter mode, one or more first syntaxes are signalled or parsed to indicate whether the stop node uses coding-tree-sharing or non-coding-tree-sharing.

3. The method of claim 2, wherein if said one or more first syntaxes indicate that the stop node uses the coding-tree-sharing, the stop node is designated as a leaf node.

4. The method of claim 2, wherein if said one or more first syntaxes indicate that the stop node uses the non-coding-tree-sharing, the stop node is further split.

5. The method of claim 4, wherein one or more luma syntaxes associated with the stop node are signalled or parsed prior to one or more chroma syntaxes associated with the stop node.

6. The method of claim 1, wherein if the stop node is greater than M×N for the luma component, the prediction mode for the stop node corresponds to an Intra mode and the stop node uses coding-tree-sharing.

7. The method of claim 1, wherein if the prediction mode for the stop node corresponds to an Intra mode or a non-Inter mode, further coding the stop node using non-coding-tree-sharing.

8. The method of claim 1, wherein if the stop node is greater than M×N for the luma component, the stop node is inferred to be partitioned into multiple TUs (transform units) in residual coding of the stop node.

9. The method of claim 1, wherein if the stop node is greater than M×N for the luma component, the prediction mode for the stop node is inferred as an Inter mode or is not allowed to be an Intra mode.

10. An apparatus of video encoding and decoding used by a video encoding system and video decoding system respectively, the apparatus comprising one or more electronic circuits or processors arrange to:
   receive input data associated with a current data unit in a current picture, wherein the input data associated with the current data unit correspond to pixel data of the current data unit, and wherein the current data unit comprises a luma component and a chroma component and the current data unit comprises a luma data unit and a chroma data unit;
   split the luma data unit and the chroma data unit using one shared tree until the luma data unit and the chroma data unit reach a stop node;
   encode or decode the stop node as a leaf CU (coding unit) if the stop node is greater than M×N for the luma component, M and N are positive integers; and
   signal or parse a prediction mode for the stop node if the stop node is smaller than or equal to M×N for the luma component.

* * * * *